Feb. 17, 1970 K. P. LUNDGREN 3,496,467
AUTOMATIC TONE CODED SQUELCH CIRCUIT
FOR RADIO COMMUNICATION SYSTEM
Filed Oct. 13, 1967 2 Sheets-Sheet 1

Inventor
KENNETH P. LUNDGREN
By
Mueller, Aichele & Rauner
Attys.

Feb. 17, 1970 K. P. LUNDGREN 3,496,467

AUTOMATIC TONE CODED SQUELCH CIRCUIT FOR RADIO COMMUNICATION SYSTEM

Filed Oct. 13, 1967 2 Sheets-Sheet 2

Inventor
KENNETH P. LUNDGREN

By *Mueller, Aichele & Rauner*

Attys.

United States Patent Office 3,496,467
Patented Feb. 17, 1970

3,496,467

AUTOMATIC TONE CODED SQUELCH CIRCUIT FOR RADIO COMMUNICATION SYSTEM

Kenneth P. Lundgren, Arlington Heights, Ill., assignor to Motorola, Inc., Franklin Park, Ill., a corporation of Illinois Filed Oct. 13, 1967, Ser. No. 675,092
Int. Cl. H04b 7/00
U.S. Cl. 325—21 10 Claims

ABSTRACT OF THE DISCLOSURE

Two-way radio communication equipment with squelch circuit responsive to a tone of a particular frequency to render audio stages of receiver operative and hold the same operative as long as a carrier wave is received, and to energize call light. At the initiation of transmission, removal of microphone from hang-up box turns off call light and allows squelch to open to monitor the channel. The tone selective circuit is connected as an oscillator to apply a tone to the transmitter, with the tone also being applied to the receiver audio for the operator to hear. A timing circuit terminates the tone and prevents further generation thereof until it is reset by closing of the microphone hang-up switch.

BACKGROUND OF THE INVENTION

In two-way communication systems, squelch circuits are provided to cut off the audio output of the receiver at all times except when a desired signal is being received. This is extremely important because the receivers used have high gain and noise picked up or generated in the receiver is amplified and reproduced. This produces a very irritating sound when no signal is being received. Squelch circuits have been provided which operate in response to the reception of the carrier, and other systems respond to a particular tone transmitted in the system.

In tone squelch systems, the tone may be at a frequency outside the band of modulating frequencies and transmitted continuously with the signal. In other systems the tone is transmitted prior to signal transmission and the signal transmission must be delayed until the tone has terminated. In such systems the tone must be transmitted before the operator speaks on each exchange between the parties so that a delay is caused at each transmission. This is objectionable both because the operator must wait, and because of the additional time that the communication system is tied up.

SUMMARY OF THE INVENTION

It is therefore an object of the present invention to provide an improved squelch system for a two-way communication system wherein a tone is used to control the audio reproduction of a receiver.

It is a further object of the invention to provide an improved tone coded squelch system wherein the tone is transmitted only at the first transmission from any one station, and is not transmitted with any succession transmissions in the same series from that station.

Another object of the invention is to provide a tone coded squelch system wherein the operator at a station hears the tone at the initiation of a transmission so that he does not talk until the tone has terminated.

In practicing the invention a squelch circuit is provided in an FM two-way radio communications unit including a transmitter with a microphone having a push-to-talk switch and a hang-up switch for the microphone, and a receiver having a squelch circuit responsive to noise signals to disable the audio section of the receiver when a carrier wave is not present. The tone coded squelch system includes a tone amplifier with a tuned circuit which selects tones of a particular frequency and a detector for the tones having a delay so that a control voltage is provided when the tone is received for a predetermined time duration. The control voltage operates a bistable circuit which is connected to the carrier squelch circuit to permit the squelch circuit to respond and render the audio stages of the receiver operative. The receiver remains operative as long as the carrier is received, and when the carrier terminates the carrier squelch circuit cuts off the audio stages of the receiver and resets the bistable. The control voltage also actuates a call light circuit so that the operator knows that a call has been received if he is not present to hear the message. The call light remains on until the microphone is picked up and the hang-up switch is opened to release the call light circuit.

At the initiation of a transmission, the microphone is picked up and the microphone hang-up switch actuates the squelch bistable circuit to enable the audio stage so that the operator will hear any communication taking place on the channel. If the channel is free, the push-to-talk switch is actuated and this connects a circuit to provide feedback for the tone amplifier so that it forms an oscillator at the frequency of the tuned circuit. The tone produced is applied to the modulator of the transmitter for transmission in the system, and to the audio amplifier of the receiver for the operator to hear. The tone amplifier is disabled by a timing circuit which starts a time interval at the same time the tone is initiated. The timing circuit disables the tone amplifier and holds the same inoperative until the microphone is hung up, with the closing of the hang-up switch resetting the timing circuit.

DESCRIPTION OF THE PREFERRED EMBODIMENT

Figure 1:
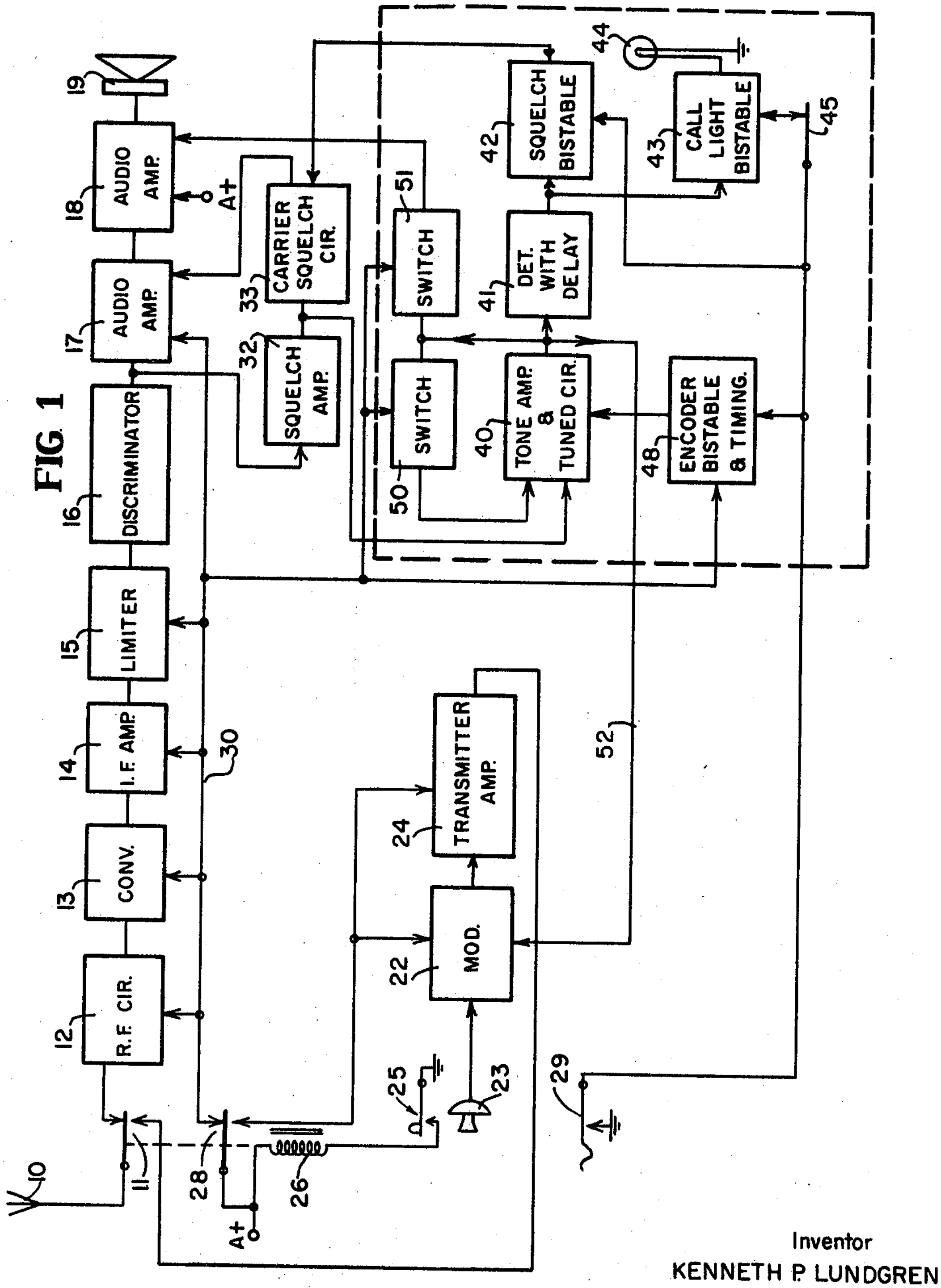
FIGURE 1 is a block diagram showing the automatic tone coded squelch system of the invention and the coupling thereof to an FM two-way radio communication transmitter and receiver.

Referring now to the drawings, in FIGURE 1 there is shown a two-way radio communication unit including an antenna 10 which applies signals through switch contact 11 to radio frequency circuit 12. This circuit selects signals in a particular frequency band and may or may not include an amplifier to increase the level of the received signals. The signals are applied to a converter 13 which reduces the frequency to an intermediate frequency. The converter 13 may include one or more stages of frequency conversion with crystal oscillators to provide the local oscillations.

The intermediate frequency (IF) signal is amplified in amplifier 14 and limited in limiter 15, each of which may include a plurality of stages. The modulation is derived from the limited wave by discriminator 16, which applies the audio signal to audio amplifiers 17 and 18 in turn. The amplified audio signal is reproduced by loudspeaker 19.

The transmitter of the system includes a modulator 22 to which audio signals are applied by microphone 23. The modulated wave is amplified in amplifier 24, and if desired this may include frequency multiplier stages to provide the desired output frequency. The microphone 23 includes a push-to-talk switch 25 which when closed energizes relay 26. The relay 26 actuates the antenna switch contact 11 and a power supply switch contact 28. When the push-to-talk switch is operated the output of the transmitter is applied through the switch contact 11 to the antenna 10. At this time A+ power is applied through switch contact 28 to the stages of the transmitter. When the relay 26 is released, contact 28 applies A+ power to the stages of the receiver.

The transmitter also includes a hang-up switch 29 which is closed when the microphone is in position thereon. When the microphone is removed from the hang-up switch for use, the switch 29 is open.

The audio output from discriminator 16 is applied to squelch amplifier 32 which amplifies and limits the signal received from the discriminator. The output of squelch amplifier 32 is applied to carrier squelch circuit 33 which selects signals at a frequency above the audio or other modulating signal, and rectifies the same to produce a control signal. The control signal is applied to the audio amplifier 17 to control the operation thereof. Reception of a strong noise signal above the frequency of the modulation will produce a control signal which biases the audio amplifier 17 so it is nonconducting. The operation of the squelch amplifier and carrier squelch circuit is described in application Ser. No. 675,104, filed Oct. 13, 1967, by Daniel D. Russell, Jr. (Case No. 67115). The carrier squelch circuit will permit the audio output to be operative when a carrier signal is received such that the noise is reduced.

The automatic tone coded squelch system includes a tone amplifier and tuned circuit 40 to which signals from the output of the squelch amplifier 32 are applied. The tuned circuit will select a tone of a particular frequency and applies the same to the detector 41. The detector includes a delay circuit so that a selected signal must be applied for a predetermined time period to provide the tone squelch control signal. This signal is applied to bistable circuit 42 and triggers the same to permit the carrier squelch circuit 33 to respond to the carrier wave (reduction in noise) to render the audio amplifier operative. The tone coded squelch control holds the carrier squelch circuit closed until the desired tone is received. The carrier squelch circuit will hold the audio circuit operative as long as a carrier is received. When the carrier wave terminates, the voltage from the carrier squelch circuit 33 will reset the squelch bistable 42.

The tone squelch control signal from detector 41 is also applied to the call light bistable circuit 43 which energizes the indicator lamp 44. Accordingly, when the tone is received the bistable circuit 43 will be actuated to cause lamp 44 to be lit and this lamp will remain lit until the bistable is reset through operation of the microphone hang-up switch 29. If it is desired not to use the call light, the switch 45 can be opened so that the bistable remains reset and will not be actuated by the tone control signal.

When it is desired to transmit, the microphone 23 is removed from the hang-up switch 29. The opening of the switch 29 resets the call light bistable circuit 43, and disables the squelch bistable circuit 42. This permits the carrier squelch circuit 33 to open the audio of the receiver when a carrier is present so that the operator can hear any communication on the channel. This is independent of whether the transmitting station operates on the same coded tone frequency so that the operator can monitor any communication at all on the channel and will not interrupt a communication in progress. If the operator hears no communication when he removes the microphone from the switch 29, he can operate his push-to-talk switch 25 to condition the system for transmission. This operates contact 11 to connect the transmitter output to the antenna, and contact 28 to apply A+ power to the transmitter stages.

The push-to-talk operation through removal of A+ potential from the conductor 30 actuates switches 50 and 51 of the tone squelch circuit. Switch 50 completes a circuit from the output of the tone amplifier 40 to the input thereof so that this circuit operates as an oscillator. The tuned circuit remains in the oscillator circuit so that the oscillator operates at the frequency to which the circuit is tuned. The oscillations produced by the circuit 40 are applied through switch 51 to the audio amplifier 18 so that they are reproduced in loudspeaker 19 and are heard by the operator. The oscillations are also applied through conductor 52 to the modulator 22 so that they modulate the carrier wave which is transmitted. The encoder bistable and timing circuit 48 is also triggered by the removal of A+ potential from conductor 30. This starts a timing period and at the end of the period the bistable and timing circuit 48 operates to disable the tone amplifier 40. This terminates the transmission of the tone. When the operator hears that the tone is terminated, he can start talking into the microphone 23 to communicate with another unit having a squelch circuit which responds to the tone which has been transmitted.

In a communication which includes a number of exchanges of words between the two parties communicating, and during which the microphone 23 remains off the hang-up switch 29, the bistable circuit 48 will hold the tone amplifier disabled so that after the first operation of the push-to-talk switch 25, tones will not be transmitted on subsequent operations thereof. The first time the push-to-talk switch 25 is operated the tone is transmitted and will open the squelch at all other units responding to the particular tone. The call will normally be to only one of these units and the others will hear the first exchange of words but will not hear the remainder of the communication as the tone is not transmitted again. The stations involved in the communication will have their microphones removed from the hang-up switches so that the squelch bistables 42 will be disabled and their receivers will operate in response to a carrier in the carrier squelch mode.

Figure 2:
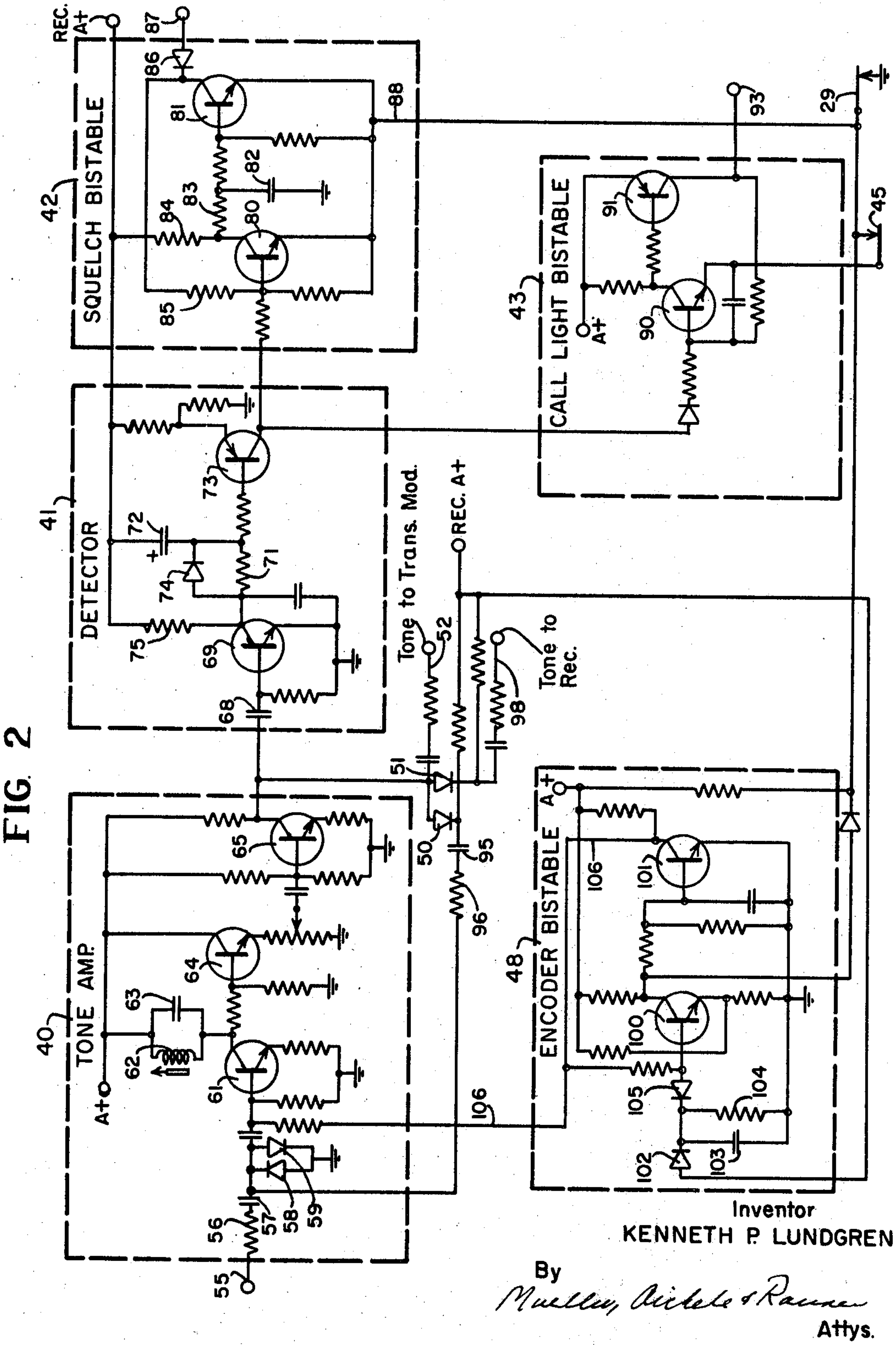
FIGURE 2 is a circuit diagram of the automatic tone coded squelch system.

In FIGURE 2, a complete circuit diagram of the tone squelch circuit is shown. The audio from the squelch amplifier is applied to input terminal 55 of the tone amplifier 40. This is applied through resistor 56 and capacitor 57 to the back-to-back diodes 58 and 59 which symmetrically clip the audio signal. The signal is amplified by transistor 61 having a tuned circuit connected to its collector electrode. The tuned circuit includes inductor 62 and capacitor 63 which form a parallel resonant circuit at a particular tone frequency. The selected signal is applied in turn to transistor amplifier stages including transistors 64 and 65.

The tone at the output of the amplifier 40 is applied to the detector 41, being coupled through capacitor 68 to the base electrode of transistor 69. The detected voltage is applied through resistor 71 to charge capacitor 72. The values of resistor 71 and capacitor 72 are selected to provide a delay so that a control voltage is not provided until the tone signal has been received for a sufficient duration, such as one-half second. When the capacitor 72 charges to a predetermined value, the transistor 73 is rendered conducting and the control potential is derived from the collector thereof. Diode 74 provides a path for discharge of capacitor 72 through resistor 75 so that the detector is conditioned for the next operation.

As previously stated, the control voltage from the detector 41 is applied to the squelch bistable 42 and to the call light bistable 43. The squelch bistable includes transistors 80 and 81, with transistor 80 being normally nonconducting and transistor 81 being normally conducting. The control voltage applied to transistor 80 renders the same conducting. Capacitor 82 charges from the A+ potential through resistors 83 and 84, and when transistor 80 conducts capacitor 82 is discharged therethrough. This reduces the voltage applied to the base of transistor 81 to cut off this transistor. Resistor 85 provides feedback from transistor 81 to transistor 80 for bistable action. The collector of transistor 81 is connected through diode 86 to the terminal 87 which is connected to the carrier squelch circuit 33 of FIGURE 1. Terminal 87 is effectively at ground potential when transistor 81 conducts to ground the input to the audio amplifier 17 so that the receiver is silenced. When the bistable 42 is triggered, the potential at terminal 87 rises to a positive value so that the carrier squelch circuit 33 is effective to control the audio amplifier 17. When the carrier being received is terminated, the carrier squelch circuit 33 will apply a ground potential to terminal 87 which will render transistor 80 nonconducting. The capacitor 82 will then charge to apply a potential to the base of transistor 81 to render the same conducting to reset the bistable 42. The charge time of capacitor 82 prevents resetting too quickly on weak signals.

The emitters of transistors 80 and 81 of the squelch bistable 42 are connected through conductor 88 to the microphone hang-up switch 29, which normally grounds the emitters. When it is desired to transmit and the microphone is removed from the hang-up box, the hang-up switch opens so that the connection from the emitters to ground is broken. This disables the squelch bistable circuit and removes the ground at terminal 87. This permits the carrier squelch circuit 33 (FIG. 1) to operate so that the audio amplifier is operative on any carrier received, and the operator can tell if the channel is free. When the microphone is returned and the switch 29 is closed and the emitters are grounded, the potential across capacitor 82 is applied to the base of transistor 81 to cause the same to conduct. This resets the bistable 42 immediately when the microphone is hung up.

The call light bistable 43 includes transistors 90 and 91 with transistors 90 and 91 both being normally cut off. The control voltage from detector 41 turns transistor 90 on, and when transistor 90 conducts the voltage from the collector electrode is applied to the base of transistor 91 to turn this transistor on. This will apply the A+ potential through transistor 91 to terminal 93, which is connected to the signal lamp to energize the same. The transistors 90 and 91 remain conducting until the connection from the emitter of transistor 90 to ground is broken. This can be accomplished by the hang-up switch 29, or by the signal light disable switch 45. The switch 29 turns off the call lamp when the microphone is removed from the hang-up box at the initiation of a call. The switch 45 holds the call lamp off at all times.

The switches 50 and 51 in the system of FIGURE 1 are formed by the diodes 50 and 51 in FIGURE 2. The receiver A+ potential is applied to these diodes to hold the same non-conducting. When the push-to-talk switch is operated for transmission, and the A+ potential is switched from the receiver to the transmitter, the turn off bias is removed from the diodes 50 and 51 and these diodes are rendered conducting. The diode 50 connects the collector of transistor 65 of the tone amplifier 40 through capacitor 95 and resistor 96 to the input of the tone amplifier, to provide feedback which is of the proper phase and amplitude to produce oscillations. These oscillations will be at the frequency of the tuned circuit including inductor 62 and capacitor 63, and therefore are at the same frequency which is selected by the tone amplifier.

The tone oscillations are applied through diode 51, which is now conducting, to conductor 98 which is connected to the audio amplifier 18 of the receiver. This causes the oscillations to be amplified and reproduced in the loudspeaker 19 so they are heard by the operator. The collector of output transistor 65 of tone amplifier 40 is also connected to the conductor 52 which is connected to the modulator 22 of the transmitter. This causes the tones to modulate the carrier wave so that they are transmitted to the other stations in the communications system.

The encoder bistable and timing circuit 48 includes transistors 100 and 101, with transistor 100 normally being conducting and transistor 101 normally being cut off. The A+ receiver voltage is applied through diode 102 to charge capacitor 103 during reception. When the push-to-talk switch is operated and the receiver A+ potential is cut off, capacitor 103 will discharge through resistor 104 to provide a pulse which is applied through diode 105 to the base of transistor 100 to cut off this transistor. This will increase the potential applied to the base of transistor 101 to render the same conducting. The conductor 106 connected to the collector of transistor 101 is thereby grounded to apply a ground to the base of transistor 61 of the tone amplifier 40 and disable the same. The time required for the discharge of the capacitor 103 through resistor 104 will control the time interval before the tone amplified is disabled. This will permit the generation of the tone for a period of time, such as one second. The bistable 48 will then remain in the triggered state so that the tone amplifier is held disabled. When the microphone is replaced on the hang-up box, the switch 29 will close to ground the base of transistor 101 so that this transistor will be cut off and transistor 101 will return to its conducting state.

The automatic tone coded squelch system described acts to automatically render particular receivers operative by actuating the carrier squelch circuits thereof only when a particular tone is received with the carrier. This tone operates a bistable circuit to permit the carrier squelch circuit to activate the audio stages of the receiver. A call light bistable is also actuated by the selected tone to actuate an indicator lamp. At the initiation of a transmission the squelch bistable circuit operates to permit the carrier squelch circuit to enable the audio stages of the receiver so that the operator can hear any communication taking place on the channel. The tone amplifier used on reception is converted to an oscillator by operation of the push-to-talk switch to apply a tone to the transmitter and also to the audio stages to be heard by the operator. An encoder bistable and timing circuit disables the tone oscillator after the tone has been transmitted for a predetermined length of time and prevents transmission of the tone for succeeding operations of the push-to-talk switch until the operator places the microphone on the hang-up box to close the hang-up switch and reset the encoder bistable.

The system greatly simplifies the operation of the two-way radio equipment as the tone is automatically sent on transmission and the operator hears the tone so that he delays his voice message until the tone is terminated. After the first voice message during which the unit being called is identified, the other units in the system are not again actuated. This results in a significant improvement of the operation of the communication system.

What is claimed is:

1. In a two-way radio communications unit for communication between two or more stations including at one such station a transmitter for transmitting a modulated carrier wave and a receiver for receiving a carrier wave and deriving the modulating signals therefrom and for reproducing the modulating signals, and wherein the transmitter includes a microphone with a push-to-talk switch to be actuated during transmission, a squelch circuit including in combination, a frequency selective circuit responsive to the modulating signals derived by said receiver for selecting a tone of a predetermined audio frequency, control means connected to said receiver and to said frequency selective circuit and responsive to the selected tone for rendering the receiver operative to reproduce the derived modulating signal, switch means responsive to operation of the push-to-talk switch coupled to said frequency selective means to form therewith an oscillator providing a tone signal at the predetermined frequency, means applying the tone signal to the transmitter for transmission thereby, timing means coupled to said oscillator for disabling the same at a predetermined time after said push-to-talk switch means is operated, said timing means being thereby operative to terminate the tone signal, and a control switch coupled to said timing means and operated when the transmission is completed to reset said timing means, whereby a tone is generated in response to operation of the push-to-talk switch which continues for the predetermined time, with said timing means preventing further transmission of the tone until said control switch is operated.

2. The combination of claim 1 further including additional switch means applying the tone signal provided by said oscillator to the receiver at the one such station for reproduction thereby.

3. The combination of claim 1 including hang-up means connected to said control switch for receiving the microphone, whereby said control switch is operated when the microphone is placed on said hang-up means.

4. The combination of claim 1 wherein said frequency selective means includes amplifier means, and said control means includes a detector coupled to said frequency selective means for providing a control signal in response to a selected tone signal which has a given time duration.

5. The combination of claim 4 wherein the receiver includes a carrier squelch circuit and an audio stage selectively rendered operative by the carrier squelch circuit in response to a carrier wave, and said control means is coupled to the carrier squelch circuit to control the same, with said control means enabling said carrier squelch circuit to render said audio stage operative, in response to the control signal.

6. The combination of claim 5 wherein said control means includes a bistable circuit which is triggered by the control signal and is reset by a voltage produced by the carrier squelch circuit.

7. The combination of claim 5 wherein said control means is connected to said control switch and operates in response to opening of said control switch to condition the carrier squelch circuit to operate in response to a carrier wave.

8. The combination of claim 4 further including indicator means connected to said detector and operative in response to the control signal for indicating the receipt of the tone of the predetermined frequency at the one such station.

9. The combination of claim 8 wherein said indicator means includes a bistable circuit coupled to said detector and said control switch, and said bistable circuit is set by the control signal to provide an indication which continues after the control signal ceases and is reset by opening of said control switch.

10. The combination of claim 4 wherein said timing means includes a bistable circuit which is actuated in response to operation of the push-to-talk switch and acts after the predetermined time to disable said amplifier means and wherein said bistable circuit is reset by closing of the control switch.

References Cited

UNITED STATES PATENTS

| | | | |
|---|---|---|---|
| 2,980,794 | 4/1961 | Hargreaves et al. ---- | 343—226 |
| 3,250,997 | 5/1966 | Cole et al. ---------- | 325—392 |
| 3,387,212 | 6/1968 | Kaufman ------------ | 325—64 |

JOHN W. CALDWELL, Primary Examiner

J. A. BRODSKY, Assistant Examiner

U.S. Cl. X.R.

325—55, 64, 392, 466; 343—226